United States Patent [19]

Young

[11] 4,243,131
[45] Jan. 6, 1981

[54] CONVEYING APPARATUS
[75] Inventor: Andrew Young, Coatbridge, Scotland
[73] Assignee: Lamberton & Company Limited, Lanarkshire, Scotland
[21] Appl. No.: 89,279
[22] Filed: Oct. 26, 1979
[51] Int. Cl.³ .............................................. B65G 13/12
[52] U.S. Cl. ............................... 193/35 MD; 198/785
[58] Field of Search ............. 198/780, 785; 193/35 R, 193/35 MD, 37, 38, 41; 308/20, 139, 140

[56] References Cited

U.S. PATENT DOCUMENTS

| | | | |
|---|---|---|---|
| 799,699 | 9/1905 | Winter | 193/35 R |
| 2,555,078 | 5/1951 | Gaylor | 193/35 MD UX |
| 2,949,992 | 8/1960 | Weinberg | 193/35 MD |
| 4,036,345 | 7/1977 | Webb | 193/35 MD X |
| 4,180,150 | 12/1979 | Moore | 193/35 MD |

FOREIGN PATENT DOCUMENTS 1456513  4/1966  Fed. Rep. of Germany ........... 198/785

Primary Examiner—Robert B. Reeves
Assistant Examiner—Gene A. Church
Attorney, Agent, or Firm—Mason, Fenwick & Lawrence

[57] ABSTRACT

Apparatus for conveying metal articles between work stations comprises spaced apart skids which have substantially continuous conveying surfaces composed of rows of rotatable elements. The elements have their rotational axes inclined at a small angle which is in the range 2–10 degrees away from the normal to the conveying surface and have work surfaces which are rotatable so that portions thereof move into and out of the conveying surface.

7 Claims, 11 Drawing Figures

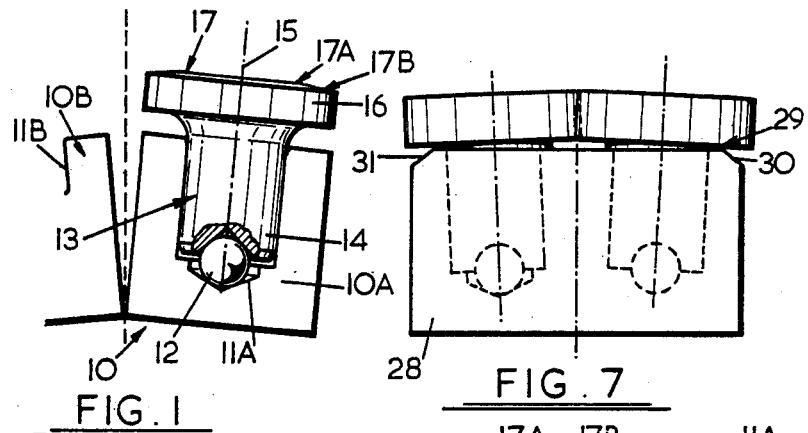
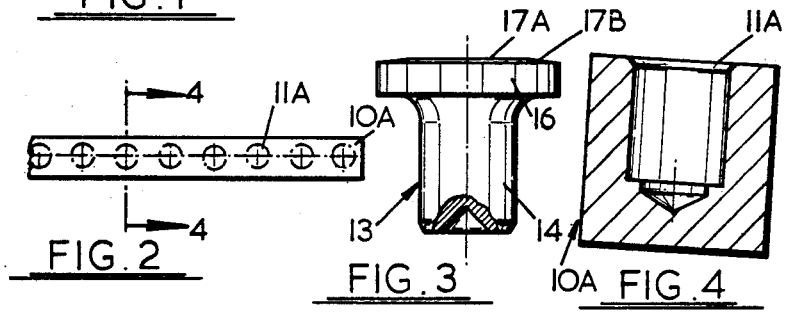
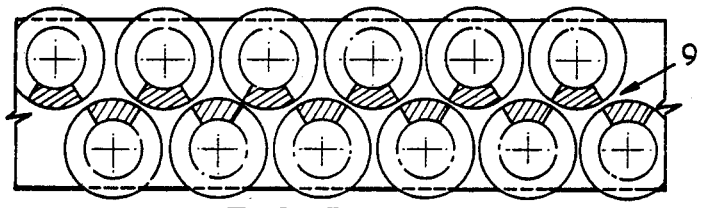
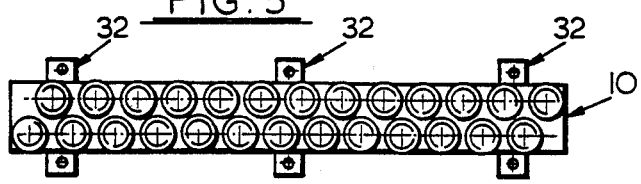

CONVEYING APPARATUS

This invention relates to apparatus having a conveying surface for supporting and conveying articles between work stations.

According to the present invention there is provided apparatus having a conveying surface for supporting and conveying articles between work stations, comprising a plurality of elements each rotatably mounted about an axis inclined at a small angle to the normal to the conveying surface and having a surface portion which is radially spaced from said axis and which forms part of said conveying surface.

Preferably, each element includes a disc portion and a stem portion, the stem portion defining said axis about which the element is rotatably mounted and the disc portion having an annular peripheral surface inclined at said small angle to a plane perpendicular to said axis. Conveniently, the diameter of said disc portion is greater than the diameter of said stem portion.

Conveniently, thrust bearing means rotatably support said stem portion on a support member. Part of the thrust bearing means may be integral with the stem portion. The thrust bearing means may include a bearing surface forming part of a sphere. The thrust bearing means may include a spherical bearing member interposed between the end of the stem portion of each element and the support member. Alternatively, the thrust bearing means may include a part-spherical end face on the stem portion. Other forms of thrust bearing means may be used around the circumference of the stem portion.

The stem portion of the elements may each incorporate a circumferentially-extending annular recess adapted to accommodate a locating spigot releasably secured to the support member, to secure the elements to the support member while permitting rotational movement of the elements with respect to the support member. The spigots may be in the form of grub screws with domed ends for engaging in the recesses.

The support member may be orientated to provide a horizontal conveying surface or an inclined conveying surface.

Embodiments of the present invention will now be described by way of example with reference to the accompanying drawings, in which FIG. 1 is an end view of part of a first embodiment according to the present invention;

FIG. 2 is a plan view of a component of FIG. 1;

FIG. 3 illustrates a further component of FIG. 1 in greater detail;

FIG. 4 is a cross section taken in the line 4—4 of FIG. 2;

FIG. 5 is a diagrammatic plan view of the embodiment and illustrating the formation of the conveying surface;

FIGS. 6 and 7 are plan and elevational views of a second embodiment; and

Figure 8:
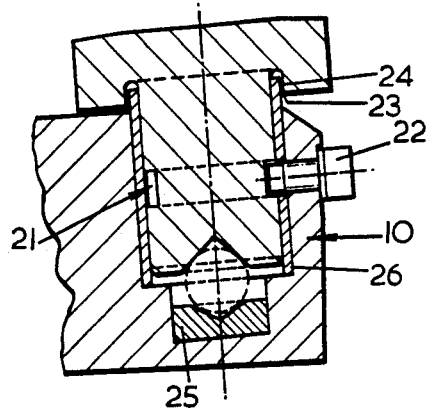
FIGS. 8, 9, 10 and 11 illustrate modification of details of the embodiments.

The embodiments are primarily intended for conveying metal articles between work stations and in particular form skids which are useful in the handling of steel workpieces such as H, I, T or U sections where there is usually an attendant high level noise accompanying the conveying motion caused by vibration of the relatively thin portions of the sections. One embodiment has been tested to convey H section steel beams of various dimensions in the range 6×3 inches (15×7.5 cms) to 36×12 inches (90×30 cms) and a noise level in the region of 80 decibels (acoustic) has resulted. In conventional skids as used in steel mills in Great Britain (which take the form of fixed metal rails) such steel beams would be expected to produce noise levels of the order of 120 decibels (acoustic).

In FIGS. 1–5 of the drawings, the apparatus comprises a support member 10 in the form of two elongate blocks 10A, 10B each incorporating a row of blind cylindrical holes 11A, 11B (see FIG. 2) and arranged side-by-side so that the holes 11A are staggered with respect to the holes 11B. The base of the holes is shaped as shown in FIG. 4 to form the seat for a thrust bearing 12 in the form of a spherical ball. A plurality of elements 13 (see FIG. 3) each having a cylindrical stem portion 14 are rotatably mounted on the support member 10 by means of the stem portions 14 entering the respective holes 11A, 11B, the end face of each stem portion 14 being shaped to form a seat on the bearing 12. Each stem portion 14 is a close fit in the hole 11A, 11B, and defines an axis of rotation 15 for the element. Integral with each stem portion 14 is a disc portion 16 which presents an upper surface 17 having a central portion 17A extending in a plane which is normal to the axis 15 and an annular peripheral portion 17B which is inclined at a small angle to that normal plane. The small angle may be 2 or 3 degrees but is not greater than 10 degrees. The axis 15 of the stem portion 14 is inclined to the vertical denoted by line 8 of FIG. 1 so that part of the surface portion 17B of each of the elements 13 is tangential to a horizontal plane and these tangential parts form the conveying surface of the apparatus. It will be noted that the portion (17B) forms part of a protruding conical surface, the half angle of the cone being between 80 and about 88 degrees.

In FIGS. 1–5 the inclination of the axis 15 is achieved by inclining each of the blocks 10A, 10B, and it will be noted that, when viewed from the end of the blocks 10A, 10B the axis 15 of one row is inclined away from the vertical in the opposite direction to that of the other row. This permits the tangential parts of the surface portions 17B of one row to adjoin the tangential parts of the surface portions 17B of the other row of elements 13 thereby providing a substantially continuous elongate conveying surface (9) for a workpiece as depicted by the hatched portions in FIG. 5. The diameter of the disc portions 16 of the elements 13 may be selected according to the angle of inclination of the axes 15 (or of the surface portions 17B) so that the space between adjacent disc portions 16 in each row and between rows is minimised.

In operation, two support members 10, each as described, are spaced apart by a convenient distance, e.g. two yards (2 meters approximately) and in consequence a skid conveyor is formed. A workpiece, such as a metal section is supported on and moved over the conveying surface (9) formed by the tangential parts of the surface portions 17B in order to convey the workpiece between stations. The action of moving the workpiece, either by hand or by mechanical means causes the elements 13 of each member 10 supporting the workpiece to rotate in turn and convey the workpiece substantially without sliding motion taking place between the workpiece and the conveying surface. This substantially reduces the force required to move the workpiece and reduces the tendency to induce vibration in the workpiece thereby reducing noise. All components of the apparatus may be made of metal thereby making the apparatus robust as is required in the environment of a steel mill or steel yard and the individual components may be replaced without difficulty insofar as the elements 13 may be released from the support members 10 as may the bearing balls 12.

Various modifications may be made to details of the embodiment described with reference to FIGS. 1–5. For example as shown in FIG. 8 the stem portions 14 may each incorporate an annular groove 21 for reception of the head of a locating spigot 22 releasably secured to the support member 10. The disc portion 16 may include a skirt portion 23 co-operating with a raised collar portion 24 on the support member 10 in order to prevent foreign matter such as metal scale fouling the rotatable mounting of the stem portion 14 in the hole 11. The collar portion 24 may be integral with the support member 10 or may form part of a sleeve for hole 11. Replaceable seats may be incorporated for the bearing ball 12 either on the stem portion 14 or in the hole 11 (such as that shown at 25) or on both. The hole 11 may accommodate a removable liner 26. The central portion 17A of disc portion 16 may be disked or undercut so that the annular surface portion 17A has a substantially constant radial width irrespective of wear occurring due to continuous use of the apparatus.

The apparatus may take the form shown in FIGS. 6 and 7 where the support 10 is a single component and the holes 11A, 11B are drilled or cast at a non-perpendicular angle to the lower horizontal base surface 28 of the support 10. Each hole includes a liner 29 and the lateral upper edges 30, 31 of the support 10 adjacent the holes 11 are cut away to provide ducts which permit scale and other foreign matter to be shed away from the holes 11. The support 10 includes lateral lugs 32 for securing the support 10 to a base structure (not shown).

Figure 9:
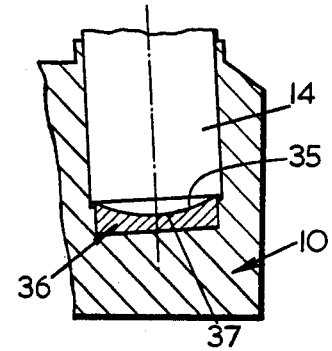

The bearing may take the form shown in FIG. 9 where the stem portion 14 has a part-spherical end face 35 and an inset 36 in the hole 11 has a correspondingly shaped upper face 37.

Figure 10:
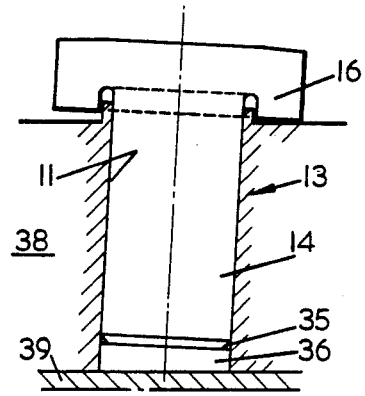

The apparatus may take the form shown in FIG. 10 where the stem portion 14 of the element 13 has a part-spherical end face 35 and the support 10 comprises a first member 38 incorporating a plurality of through holes 11 only one of which is shown, and a second member 39 which acts as a base plate for the member 38. Thus as base for each of the holes is formed by the member 39 and as is shown a removable insert 36 acts as part of the bearing arrangement. The axis of the hole 11 is inclined to the upper surface of the member 38 in order to provide the required orientation of the disc portion 16 of the member 13.

Figure 11:
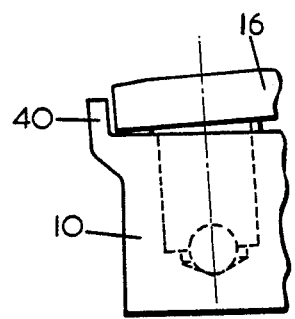

In a further modification each block 10A, 10B has an elongate guard rail 40 extending longitudinally of the block as depicted in FIG. 11. This guard rail 40 serves to protect the disc portion 16 of the elements 13 from damage due to laterally directed blows from a workpiece being fed on to the apparatus.

What is claimed is:

1. Apparatus having a conveying surface for supporting and conveying articles between work stations, comprising
a support on which a plurality of elements are individually rotatably mounted, the elements being arranged in two adjacent rows in each of which the elements are equally spaced apart, the elements of one row being staggered with respect to the elements of the other row, each element being mounted for rotation about an axis which is inclined at a small angle to the normal to the conveying surface and having a surface portion which is radially spaced from said axis different parts of which surface portion become tangential to said conveying surface according to the rotational position of the element, the inclination of the axes of the elements of said one row with respect to said normal being of opposite sense to the inclination of the axes of the elements of said other row, and the spacing between adjacent elements being such that a substantially continuous conveying surface is formed by the tangential surface-portion parts of adjacent elements.

2. Apparatus as claimed in claim 1, wherein each element includes a disc portion and a stem portion, the stem portion being rotatably mounted on the support so as to define said axis and the disc portion including said surface portion in the form of an annular peripheral surface inclined at said small angle to a plane perpendicular to said axis.

3. Apparatus as claimed in claim 2, wherein the stem portion of each element has a circumferentially-extending annular recess adapted to accommodate a locating spigot releasably secured to the support to secure the elements to the support while permitting rotational movement of the elements with respect thereto.

4. Apparatus as claimed in claim 1, wherein the elements are rotatably mounted on the support by interengaging spigots and sockets and intermediate adjacent sockets of each row the support is shaped to cause removal of wast materials from the vicinity of the sockets.

5. Apparatus as claimed in claim 1, wherein said conveying surface is one of a pair of such surfaces formed in identical manner and mutually spaced apart by a distance many times greater than the spacing between adjacent elements in a row.

6. Apparatus as claimed in claim 4 wherein the spigots are rotatably located in said sockets and supported by thrust bearings.

7. Apparatus as claimed in claim 4 wherein each spigot is integral with a substantially cylindrical disc on which said surface portion is formed as part of a protruding cone the axis of which is coincident with the axis of the spigot, the cone having a half angle in the range 80–88 degrees.

* * * * *